US009425006B2

(12) United States Patent
Attar et al.

(10) Patent No.: US 9,425,006 B2
(45) Date of Patent: Aug. 23, 2016

(54) SWITCH ASSEMBLY, A SWITCHING DEVICE COMPRISING A SWITCH ASSEMBLY, A SWITCHGEAR COMPRISING A SWITCHING DEVICE AND A METHOD FOR COOLING

(71) Applicant: ABB Technology Ltd, Zurich (CH)

(72) Inventors: Elham Attar, Porsgrunn (NO); Ståle Talmo, Skien (NO); Thor Endre, Skien (NO); Tom-Rune Bjortuft, Porsgrunn (NO)

(73) Assignee: ABB Technology Ltd, Zurich (CH)

( * ) Notice: Subject to any disclaimer, the term of this patent is extended or adjusted under 35 U.S.C. 154(b) by 0 days.

(21) Appl. No.: 14/779,852

(22) PCT Filed: Mar. 28, 2013

(86) PCT No.: PCT/EP2013/056750
§ 371 (c)(1),
(2) Date: Sep. 24, 2015

(87) PCT Pub. No.: WO2014/154292
PCT Pub. Date: Oct. 2, 2014

(65) Prior Publication Data
US 2016/0064171 A1  Mar. 3, 2016

(51) Int. Cl.
*H01H 33/91* (2006.01)
*H01H 9/52* (2006.01)
(Continued)

(52) U.S. Cl.
CPC ............ *H01H 33/91* (2013.01); *H01H 9/52* (2013.01); *H01H 33/66207* (2013.01);
(Continued)

(58) Field of Classification Search
CPC ...... H01H 33/91; H01H 33/912; H01H 33/42; H01H 33/66; H01H 33/16; H01H 33/666; H01H 1/00; H01H 11/00; H01H 9/00; H05K 7/20; G06F 1/20
USPC .................. 361/601–605, 617–619, 673, 676, 361/690–694; 218/10, 14, 118–121, 218/134–140, 152–155; 200/144, 50.2, 200/400, 401, 289, 502; 165/104.33

See application file for complete search history.

(56) References Cited

U.S. PATENT DOCUMENTS 3,261,953 A * 7/1966 Tilman .................... H01H 9/52
200/288
3,603,753 A * 9/1971 Frink .................. H01H 33/666
200/50.23

(Continued)

FOREIGN PATENT DOCUMENTS

CN          2935452 Y    8/2007
CN        201256110 Y    6/2009

(Continued)

OTHER PUBLICATIONS

International Search Report & Written Opinion of the International Searching Authority Application No. PCT/EP2013/056750 Completed: Dec. 10, 2013; Mailing Date: Dec. 18, 2013 11 pages.

(Continued)

*Primary Examiner* — Michail V Datskovskiy
(74) *Attorney, Agent, or Firm* — Whitmyer IP Group LLC

(57) ABSTRACT

A switch assembly including a vacuum switch mounted to an at least partly electrically conductive housing, and a holder for a vacuum bottle. The housing includes at least one gas entry opening at a lower end of the housing and at least one gas exit opening at an upper end of the housing, and a first free heat convection path between the openings to provide cooling. A second free heat convection path may be provided in a free space between the holder and vacuum bottle. A switching device for connecting the vacuum switch to a second electric conductor. An electric power distribution switchgear, encapsulating at least one three-phase module including a switching device.

15 Claims, 6 Drawing Sheets

(51) Int. Cl.
*H01H 33/662* (2006.01)
*H01H 33/42* (2006.01)
*H01H 33/66* (2006.01)
*H01H 33/666* (2006.01)

(52) U.S. Cl.
CPC . *H01H 2009/526* (2013.01); *H01H 2033/6613* (2013.01); *H01H 2033/6623* (2013.01); *H01H 2033/6665* (2013.01); *H01H 2033/912* (2013.01)

(56) References Cited

U.S. PATENT DOCUMENTS

| | | | | | |
|---|---|---|---|---|---|
| 3,814,881 | A | * | 6/1974 | Cherry | H01H 33/66 218/138 |
| 4,005,297 | A | * | 1/1977 | Cleaveland | F28D 15/02 165/104.26 |
| 4,414,447 | A | * | 11/1983 | Hruda | H01H 33/16 218/121 |
| 4,650,939 | A | * | 3/1987 | Milianowicz | H01H 1/62 200/289 |
| 5,589,675 | A | * | 12/1996 | Walters | H01H 33/666 218/140 |
| 5,753,875 | A | * | 5/1998 | Benke | H01H 9/52 200/289 |
| 6,215,082 | B1 | | 4/2001 | Davis | |
| 6,483,066 | B1 | | 11/2002 | Erk et al. | |
| 8,284,002 | B2 | * | 10/2012 | Heller | H01H 33/666 218/140 |
| 8,629,366 | B2 | * | 1/2014 | Reuber | H01H 33/66207 218/44 |
| 2008/0078664 | A1 | | 4/2008 | Schmidt et al. | |
| 2010/0326960 | A1 | * | 12/2010 | Heller | H01H 33/666 218/139 |
| 2013/0292358 | A1 | * | 11/2013 | Hu | H01H 33/42 218/5 |

FOREIGN PATENT DOCUMENTS

| | | | | |
|---|---|---|---|---|
| EP | 001139358 A1 | * | 10/2001 | ........... H01H 1/5822 |
| JP | 2005259562 A | | 9/2005 | |
| WO | 2006032619 A1 | | 3/2006 | |
| WO | 2009043361 A1 | | 4/2009 | |
| WO | 2010127957 A1 | | 11/2010 | |
| WO | 2011073452 A1 | | 6/2011 | |

OTHER PUBLICATIONS

Written Opinion of the International Preliminary Examining Authority Application No. PCT/EP2013/056750 Mailing Date: Mar. 5, 2015 6 pages.
Written Opinion of the International Preliminary Examining Authority Application No. PCT/EP2013/056750 Mailing Date: Jun. 10, 2015 9 pages.

* cited by examiner

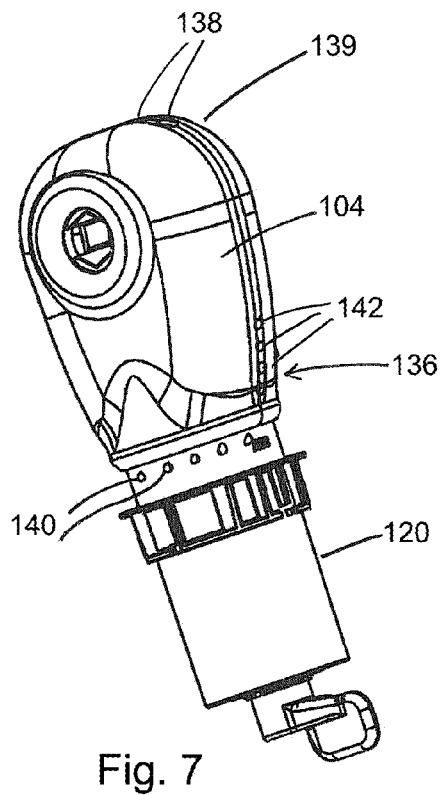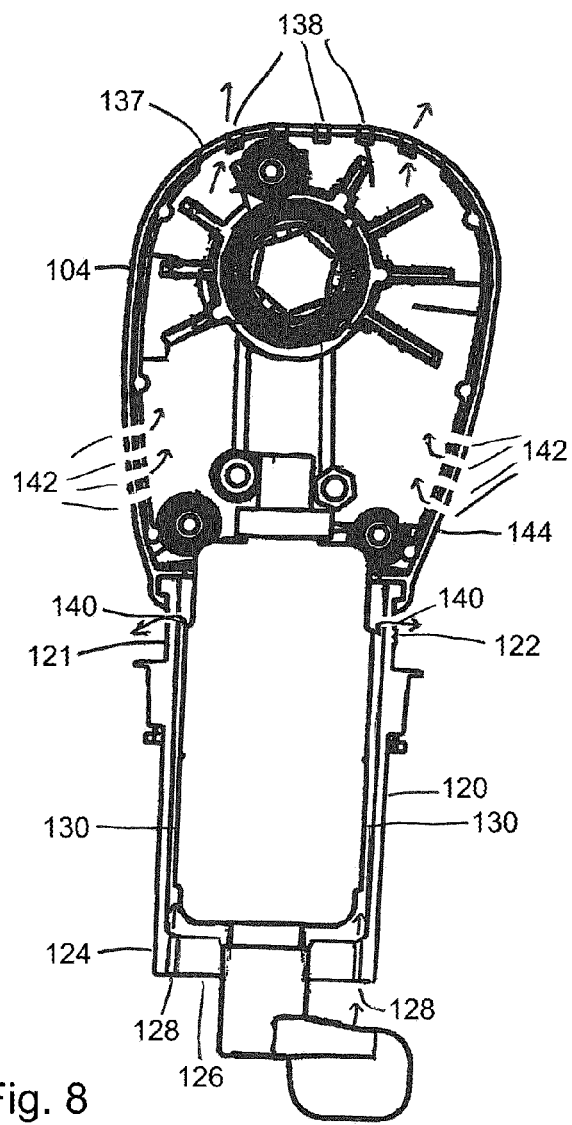
Fig. 7
Fig. 8

SWITCH ASSEMBLY, A SWITCHING DEVICE COMPRISING A SWITCH ASSEMBLY, A SWITCHGEAR COMPRISING A SWITCHING DEVICE AND A METHOD FOR COOLING

FIELD OF THE INVENTION

The present invention relates to a switch assembly that may be used in a switching device for electric power distribution. The invention further relates to electric power distribution switchgear comprising switching devices. Finally is also described a method for cooling a switch assembly.

BACKGROUND OF THE INVENTION

Switchgears used today for medium and/or high voltages, e.g. 1-1000 kV, such as 12, 24 or 36 kV, are usually gas insulated switchgears (GIS), where the used insulating fluid is Sulphur hexafluoride (SF6). The use of SF6 allows for a compact design of the switchgear, since SF6 has good properties when it concerns dielectric performance and thermal performance, in particular related to preventing and dealing with unwanted electric discharges, extinguishing arcs, and with heat dissipation.

However, SF6 is a fluorinated gas that has a high global warming potential (GWP) and therefore alternative solutions are searched for. At the same time, it is desirable to keep the compactness of present switchgears with SF6, even if utilising other insulation fluids with not as good dielectric performance.

Generally, prior art compact 3-phase switchgears used today for medium/high voltages AC power distribution systems comprise one to five modules inside a sealed encapsulation, and each module comprises three switching devices, one for each phase. The switching device often comprises a load break switch/circuit breaker connected to a first electric conductor coming into the encapsulation via an electric bushing. Further, it comprises a switch connector used for connecting or disconnecting the load break switch/circuit breaker to a second electric conductor such as a busbar connected to another module. The switch connector can comprise a knife switch that is movable between positions in which it is connected or disconnected to the busbar or ground, or disconnected from both. A current path may then be provided from the first conductor to the second conductor, via the load break switch/circuit breaker and the switch connector.

The load break switch/circuit breaker is commonly a vacuum interrupter, and it is arranged to open the circuit when certain operating conditions occur. Afters such an interruption, the switch connector, which is usually a three-position switch, may be manually or automatically disconnected from the busbar and thus disconnecting the load break switch/circuit breaker from the busbar, either by being moved to an intermediate open position or a position in which it is connected to ground.

A switchgear is previously known from WO 2012/171570 comprising a switching device of the above described type. The vacuum breaker is mounted on an electrically conductive housing that houses a guiding member for operating the vacuum breaker. Part of the current path provided from the vacuum breaker to the conductor/busbar, via the switch connector is also located in the housing. A compact switchgear is obtained and it is mentioned that it may possibly be used with air as an insulation gas.

A similar switchgear and switching device is also previously known from WO 2011/073452.

In order to be able to use an insulation medium with less good heat performance than SF6, other factors of the switchgear have to be considered that have an impact on the overall thermal performance. A switchgear can be considered as an enclosure, formed by the encapsulation, with a number of elements inside that generate heat and which dissipate heat towards the outside. The elements generating heat inside the enclosure exchange heat between themselves or other elements, by conduction, they exchange heat with the insulation gas inside the enclosure by convection, and with the walls of the enclosure itself by radiation. Most of the heat generated in a switchgear is accumulated in the housing of the vacuum breaker, which housing is also often named pole house.

Consequently, it is desirable to obtain alternative solutions in order to obtain compact gas insulated switchgear that is more environmentally friendly than the present switchgear using SF6.

SUMMARY OF THE INVENTION

An object of the present invention is to provide a switch assembly that may be used in narrow spaces and with improved cooling, and which is suitable to use in a switching device for a medium and/or high voltage switchgear. Another object is to provide a compact gas insulated switchgear (GIS) that makes it possible to use an insulation fluid with a lower GWP than the GWP of SF6, and which is preferably also so compact that it is essentially equal in space requirement to an SF6 compact gas insulated switchgear.

The above objects are achieved by the present invention.

Accordingly is defined a switch assembly comprising a vacuum switch mounted to an at least partly electrically conductive housing, and a vacuum bottle holder for holding a vacuum bottle of the vacuum switch, which vacuum bottle holder is connected to the housing, characterised in that the housing comprises at least one gas entry opening at a lower end of the housing and at least one gas exit opening at an upper end of the housing, and that a first free heat convection path is provided inside the housing between the at least one gas entry opening and the at least one gas exit opening, in order to provide cooling. By providing a housing such that a free heat convection path can be achieved inside the housing is obtained the advantage that a chimney effect is achieved that results in improved cooling of the vacuum switch. This will for example make it possible to make the housing smaller and to use the switch assembly in more narrow spaces and also make it possible to use in compact switchgears with insulation fluids in gas form that have lesser thermal properties than the regular SF6, such as for example air. This is an important advantage when considering environmental impact.

According to a further feature, the vacuum bottle holder comprises an upper end connected to the housing, a holder wall surrounding the vacuum bottle and a lower end. The vacuum bottle holder further comprises at least one gas entry opening at the lower end thereof and at least one gas exit opening at the upper end thereof, and a free space is provided between the vacuum bottle and the holder wall of the vacuum bottle holder such that a second free heat convection path is provided from the at least one gas entry opening of the vacuum bottle holder to the at least one gas exit opening of the vacuum bottle holder via said free space, in order to provide cooling. By providing a vacuum bottle holder such that a free heat convection path can be achieved between the vacuum bottle and the vacuum bottle holder is obtained the advantage that a chimney effect is achieved that results in improved cooling of the vacuum switch.

According to one feature, the lower end comprises an end plate, and the at least one gas entry opening of the vacuum bottle holder is located in the end plate. This will improve the chimney effect. The end plate may for example have a number of small openings distributed in an annular form.

According to one embodiment, the lower end of the housing may be open towards the free space between the vacuum bottle and the vacuum bottle holder, whereby said at least one gas entry opening of the housing is formed. Further, the upper end of the vacuum bottle holder that is connected to the housing may be open towards an interior of the housing whereby said at least one gas exit opening of the vacuum bottle holder is formed, and further said gas exit opening of the vacuum bottle holder may communicate with said gas entry opening of the housing, whereby said first and second free heat convection paths is a continuous path formed from the at least one gas entry opening of the vacuum bottle holder to the at least one gas exit opening of the housing via said free space and the interior of the housing. Through this is achieved a chimney effect all the way from the lower part of the vacuum bottle holder all the way up to the upper end of the housing.

According to an alternative embodiment, the lower end of the housing has a side wall part in which said at least one gas entry opening of the housing is located, whereby said first free heat convection path is formed inside the housing extending from the at least one gas entry opening in the side wall part to the at least one gas exit opening in the upper end of the housing. This has the advantage of being useful when particularly the housing needs to be cooled.

According to another embodiment, the at least one gas exit opening of the vacuum bottle holder may be located in the wall of the vacuum bottle holder, in the vicinity of the upper end of the vacuum bottle holder, whereby said second free heat convection path is formed in the vacuum bottle holder extending from the at least one gas entry opening in the end plate to the at least one gas exit opening in the holder wall, via said free space between the vacuum bottle and the vacuum bottle holder. Through this is achieved and alternative second convection path for cooling.

Further, the housing may have a housing wall with an interior surface of which at least a part has a rough surface structure providing an increased heat radiation area. The surface may have any type of surface structure that will increase the effective area, e.g. small corrugations, ridges, bumps etc. The housing itself may also be made of a material having a high thermal conductivity, e.g. an aluminium alloy.

The above defined switch assembly with free heat convection path may be used both in a load breaker switch and in a circuit breaker application, in a switchgear.

According to another aspect of the present invention is defined a switching device for electric power distribution, comprising a switch assembly according to any one of the claims defining a switch assembly, in which the at least partially electrically conductive housing is connected to a first electric conductor, a switch connector for connecting the vacuum switch to a second electric conductor, wherein a current path is provided between the first electric conductor and the second electric conductor, via the switch connector and the switch assembly. This switching device has the advantage of providing enhanced cooling of the vacuum switch and therefore offering the possibility to be used in a compact switchgear where an insulating fluid is used having a lower GWP than SF6. Thus, a more environmentally friendly switchgear is made available. The switching device can be made as a stand-alone unit, which makes it easy and practical to handle and install. The switch connector may be a three-position switch or a two-position switch.

According to yet another aspect of the present invention is defined an electric power distribution switchgear, comprising a sealed encapsulation inside which is located at least one three-phase module comprising a switching device as defined above for each one of said three phases. As mentioned above, this offers the possibility to use insulating fluids in gas form or mixtures thereof with a lower GWP than SF6.

According to another advantageous feature, the sealed encapsulation may be located inside a cabinet, and said cabinet may comprise at least one wall having at least one wall part comprising an increased heat radiation area for increased heat radiation to the surroundings, which increased heat radiation area is at least partly in contact with at least a part of the encapsulation, in order to promote cooling. According to one embodiment, the at least one wall part comprising an increased heat radiation area comprises corrugations. Through this is achieved improved cooling of the switchgear and its encapsulation. Naturally, also other types of arrangements that provide an increased heat radiation area is are conceivable, for example ridges, grooves, bumps etc. in any type of geometrical configuration.

Further, the cabinet may comprise at least one wall having at least one wall part comprising ventilation openings in the wall. These ventilation openings may be arranged such that a free heat convection path is provided inside the cabinet, between the openings. The ventilation openings may then be arranged with at least one opening at a lower end of the wall and at least one opening at an upper end of the wall. These openings may for example be arranged in the vicinity of where the corrugations terminate.

Advantageously, the electric power distribution switchgear may have a sealed encapsulation filled with a gas that has a GWP of less than 150.

The sealed encapsulation may be filled with a gas that is dry air, or a gas that comprises air mixed with another gas. This other gas may then be a gas with a very good dielectric and thermal properties but present only in a low amount, that will still make the solution environmentally friendly.

Finally, is defined, according to the present invention, a method for cooling a switch assembly comprising a vacuum switch mounted to an at least partly electrically conductive housing, and a vacuum bottle holder for holding a vacuum bottle of the vacuum switch, which vacuum bottle holder is connected to the housing, characterised by providing a free heat convection path through the housing and/or in a free space provided between vacuum bottle holder and the vacuum bottle.

Further features and advantages of the invention will also become apparent from the following detailed description of embodiments.

BRIEF DESCRIPTION OF THE DRAWINGS

A detailed description of the present invention and embodiments thereof, given as examples only, will now be made with reference to the accompanying drawings, in which:

FIG. 7 shows another embodiment of a switch assembly of the present invention, FIG. 8 is a cross section of the switch assembly in FIG. 7.

In the drawings, the same reference numbers have been given to details that are the same or correspond in the different embodiments.

DETAILED DESCRIPTION OF THE INVENTION

Figure 1:
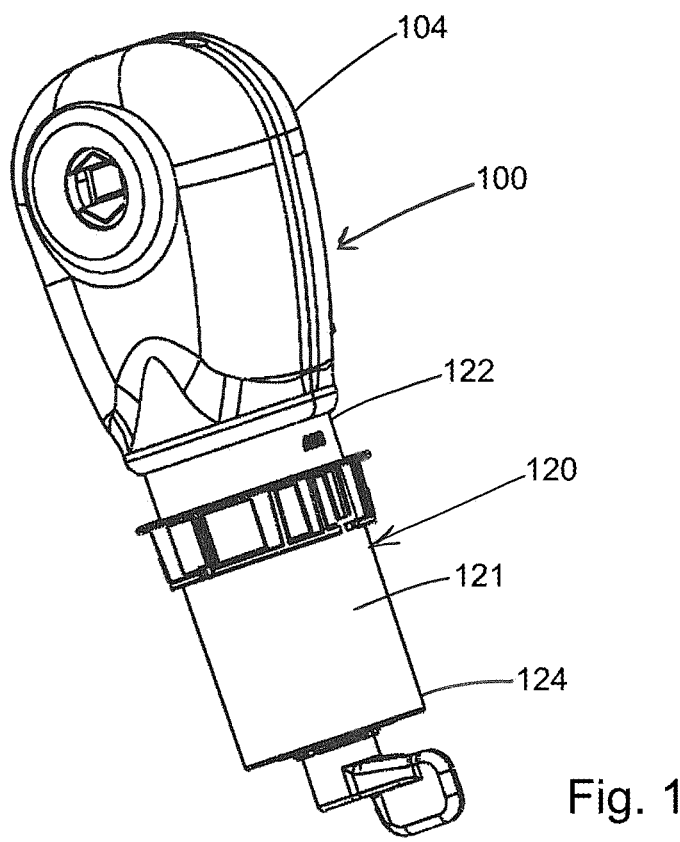
FIG. 1 illustrates schematically a switch assembly according to the present invention.
Figure 2:
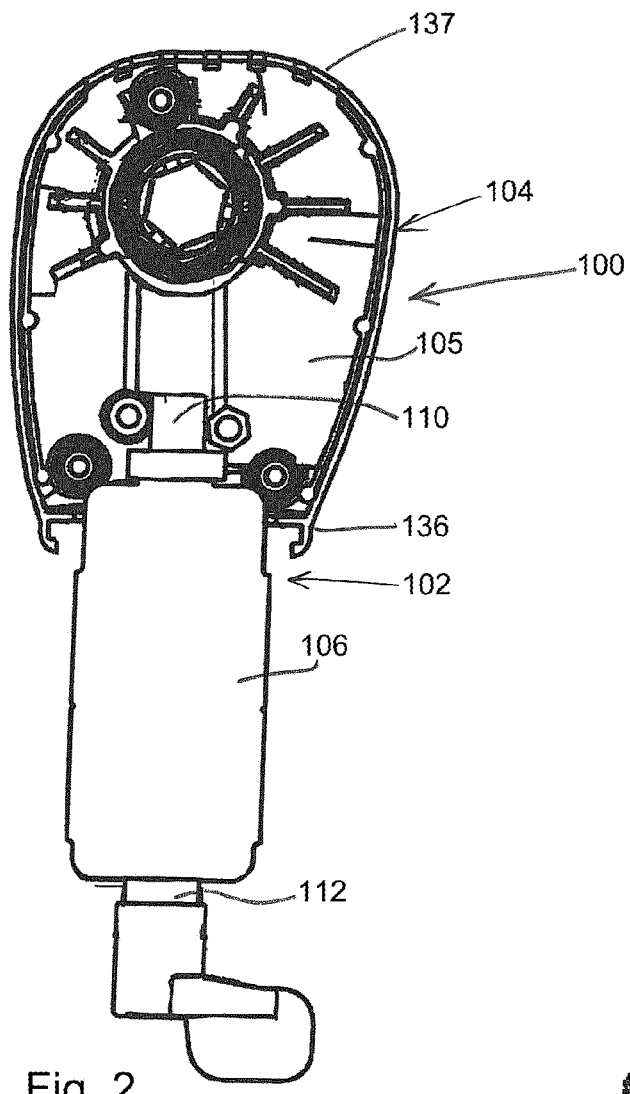
FIG. 2 shows schematically a perspective view of a vacuum switch with a housing, with part of the housing cut away.
Figure 3:
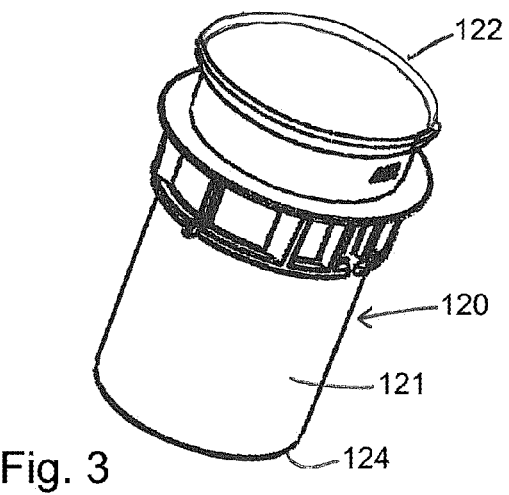
FIG. 3 shows schematically a perspective view of a vacuum bottle holder according to the present invention.

In FIGS. 1-3 is schematically illustrated an embodiment of a switch assembly 100 according to the present invention. The switch assembly comprises a vacuum switch 102 mounted to an at least partly conductive housing 104 and with a vacuum bottle 106. The vacuum switch includes in a conventional way a first terminal 110 located in the housing and which is electrically connectable to a first electric conductor (not shown), and a second terminal 112 that is electrically connectable to a second electric conductor (not shown). The vacuum switch further includes a first and a second electric contact inside the vacuum bottle. When these contacts are in contact the circuit in the vacuum switch is closed and when they are not in contact the circuit is open. Breaking of the circuit may be achieved by an operator device (FIG. 9) that may be manually or automatically operated. This type of vacuum switch or vacuum breaker is conventional and known to the skilled person and is therefore not described in further detail.

Figure 4:
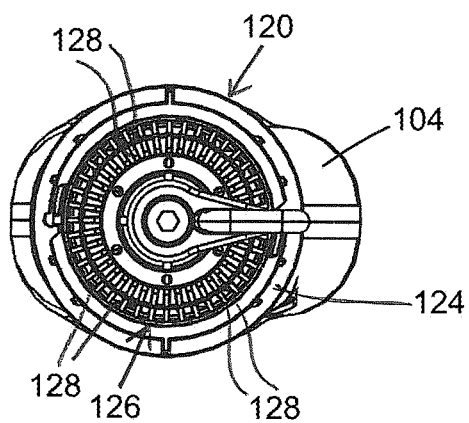
FIG. 4 shows a bottom view of the switch assembly according to the present invention.

The switch assembly 100 further comprises a vacuum bottle holder 120 adapted to surround and hold the vacuum bottle. The vacuum switch can be more permanently attached to a support structure by means of a support member to which the vacuum bottle holder is secured. In the illustrated example, the vacuum bottle holder has a cylindrical shape with a cylindrical holder wall 121 that surrounds the vacuum bottle when mounted on the bottle. The vacuum bottle holder 120 has an upper open end 122 by means of which it is connected to the housing 104 in a sealing manner. It further has a lower end 124 where an end plate 126 is located. Since the shown vacuum bottle holder is cylindrical, the end plate is circular. The end plate 126 is provided with several holes, in particular close to its circumference, which form gas entry openings 128, as will be explained later. The interior diameter of the vacuum bottle holder 120 is slightly greater than the exterior diameter of the vacuum bottle 106 itself, whereby a gap is obtained between the wall 121 of the vacuum bottle holder and the vacuum bottle that results in a free space 130 between these two, when the vacuum bottle holder is mounted on the vacuum bottle. In the illustrated embodiment of FIG. 4, the holes in the end plate 126 forming gas entry openings 128 are arranged in a general annular form along the circumference of the end plate such that communication is obtained between the surrounding of the switch assembly and the gap forming the free space 130 between the vacuum bottle and the vacuum bottle holder. Thus gas can enter via said gas entry openings 128 into said free space 130.

In FIGS. 5-6 and 7-8 are illustrated two different embodiments of the switch assembly. What have been described above are details that are common for both embodiments.

Figure 5:
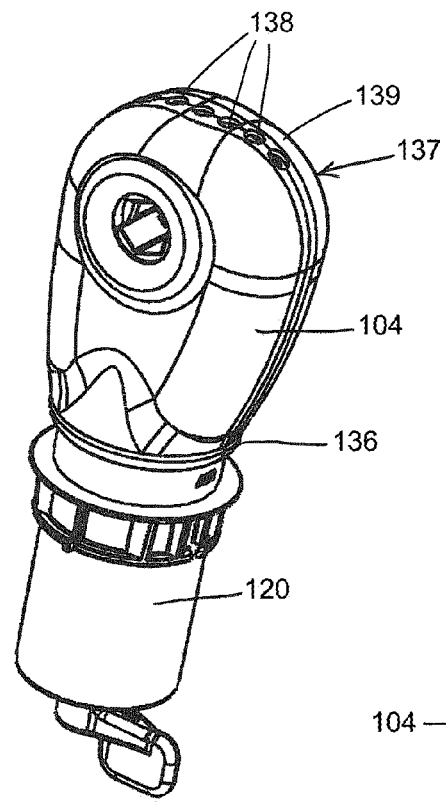
FIG. 5 shows a perspective view of one embodiment of the switch assembly according to the present invention.
Figure 6:
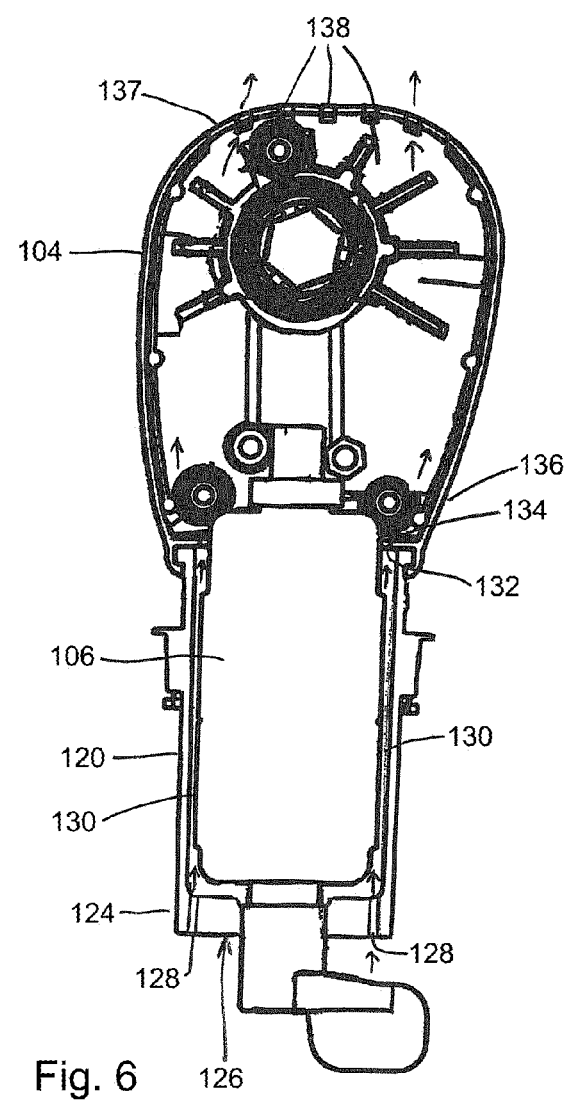
FIG. 6 is a cross section of the switch assembly in FIG. 5.

In FIGS. 5 and 6 is shown an embodiment where the housing 104 comprises gas entry openings 134 at its lower end 136, which communicate with gas exit openings 132 at the upper open end 122 of the vacuum bottle holder. In other words, the gap between the vacuum bottle and the wall of the vacuum bottle holder continues in a gap between the housing and the upper part of the vacuum switch, see also FIG. 2. As seen in FIG. 5, the housing is provided with holes in its upper end wall 139 which openings form gas exit openings 138. Since the interior of the housing 104 is an open structure, gas that enters the housing through the gas entry openings 134 at its lower end 136 will flow through the housing and out through the gas exit openings 138 at its upper end. Thus a first free heat convection path is obtained through the housing, as shown by arrows in FIG. 6.

Further, the vacuum bottle holder comprises a gas exit opening 132 formed by its upper open end that is connected to the housing 104, and this gas exit opening is in communication with the frees space 130 between the vacuum bottle and the vacuum bottle holder. Through this is obtained a second free heat convection path, as shown by the arrows, from the exterior of the switch assembly through the gas entry openings 128 in the end plate 126, via said free space 130 and out through the gas exit openings 132, through which a gas can flow in order to cool the vacuum switch. In this embodiment, the first and the second free heat convection paths form one combined continuous path, from the gas entry openings 128 in the end plate 126, through the open space 130 between the vacuum bottle and the vacuum bottle holder, and further through the housing and out through the gas exit openings 138 in the upper wall of the housing.

In FIGS. 7 and 8 is shown another embodiment, where the housing is provided with holes in its sidewall, at a lower part thereof, which holes form gas entry openings 142. These gas entry openings may be arranged close to the vacuum bottle holder and extending in a row upwards from the lower end 136 of the housing. Thus, in this embodiment, a first free heat convection path is obtained through the housing, from the gas entry openings 142 in the sidewall to the gas exit openings 138 in the upper end of the housing, as shown by arrows in FIG. 8. Naturally, there may be several rows of gas entry openings and alternatively openings may be arranged in an annular configuration around the lower end of the housing. Further, the wall 121 of the vacuum bottle holder 120 is provided with holes at its upper end forming gas exit openings 140. These gas exit openings are distributed around the circumference of the upper end 126 of the vacuum bottle holder and communicate with the free space 130 provided between the vacuum bottle and the wall of the vacuum bottle holder. Thus, in this embodiment, a second free heat convection path is provided, as shown by the arrows in FIG. 8, from the exterior of the switch assembly through the gas entry openings 128 in the end plate 126, via said free space 130 and out through the gas exit openings 140 in the wall at the upper end of the vacuum bottle holder, through which a gas can flow in order to cool the vacuum switch. It is foreseen that one may have a switch assembly where only one of the two described convection paths in the housing and in the vacuum bottle holder is implemented.

Further, in addition to the features providing a free heat convection path, the housing 104 may have a housing wall 105 with an interior surface of which at least a part has a rough surface structure providing an increased heat radiation area. The surface may have any type of surface structure that will increase the effective area, e.g. small corrugations, ridges, bumps etc. The housing itself is preferably made of a material having a high thermal conductivity, e.g. an aluminium alloy.

It should be mentioned that said gap between the vacuum bottle and the vacuum bottle holder is not necessarily a continuous gap that extends all the way around the outer circumferential wall of the vacuum bottle or the upper part of the vacuum switch, but it can naturally be interrupted by e.g. support ribs extending along the axial direction of the vacuum bottle.

The vacuum bottle holder is made of an insulating material, such as plastic. The vacuum bottle holder can also be configured to provide the additional function of constituting a fixed support when the contact inside the vacuum bottle is activated.

Figure 9:
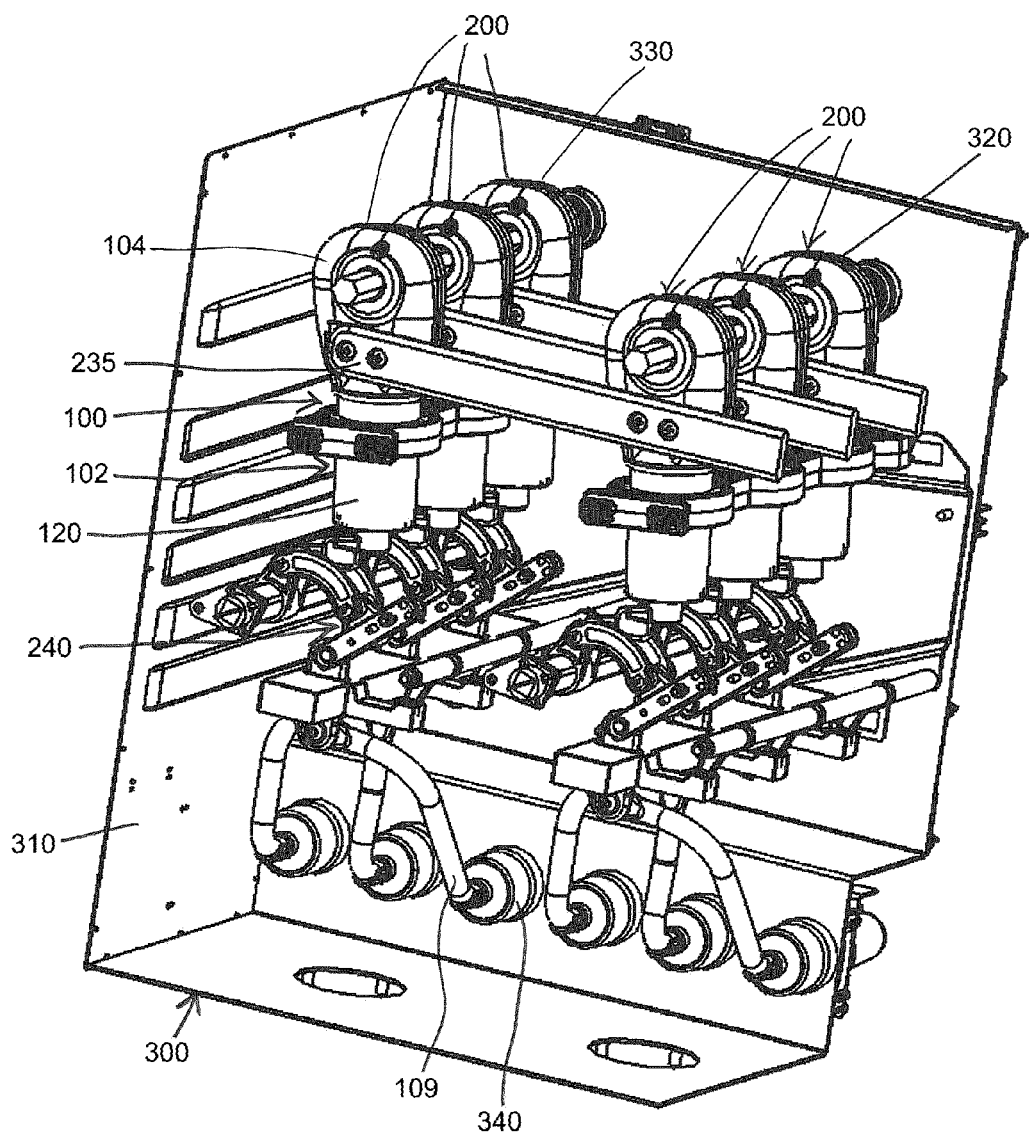
FIG. 9 shows schematically an embodiment of a switchgear according to the present invention, including switching devices with switch assemblies according to the present invention.

In FIG. 9 is shown an example of an application of the present invention in a switching device 200 used in a switchgear 300 for a three phase AC electric power distribution system. The illustrated example is a switchgear comprising two modules 320, 330 and each module comprises three poles/phases. Every phase is provided with a switching device 200 according to the invention. Other switchgears are foreseen that can include between one and up to five modules, or even more. It should be noted that it is not necessarily required that all of the modules have switching devices according to the invention.

The switching device 200 comprises a switch assembly 100 according to the present invention. The switch assembly may be configured according to any one of the embodiments described above. The switching device 200 further comprises a switch connector 240 that connects/disconnects the second terminal 112 of the vacuum switch 102 with the second electric conductor 109. In the illustrated embodiment, the switch connector is a three position switch, but in other applications it may be foreseen to use a two position switch, e.g. for connection to ground or the vacuum switch.

The switchgear 300 comprises a sealed encapsulation inside which the three-phase modules 320, 330 are located. Each one of the switching devices 200 is connected to the second conductor 109 that enters the encapsulation 310 via an electric bushing 340. Each phase of one module is connected to the corresponding phase of the other module by means of the first conductor 235 or busbar. For a switchgear comprising more than the illustrated two modules, the phases of the additional module/modules would also be connected via the conductor 235 as schematically shown in FIG. 9. The sealed encapsulation is gas tight and filled with an insulating gas, and preferably a gas that has a GWP of less than 150. For example, the sealed encapsulation can be filled with a gas that is dry air, or a gas that comprises air mixed with another gas. This other gas is preferably a gas with very good insulation properties, high dielectric performance and high thermal performance.

In order to further improve cooling, many of the individual parts of the switching device and the switchgear may be painted black, e.g. the different walls, areas of connection between different parts, the knives of the switch connector, etc.

Figure 10:
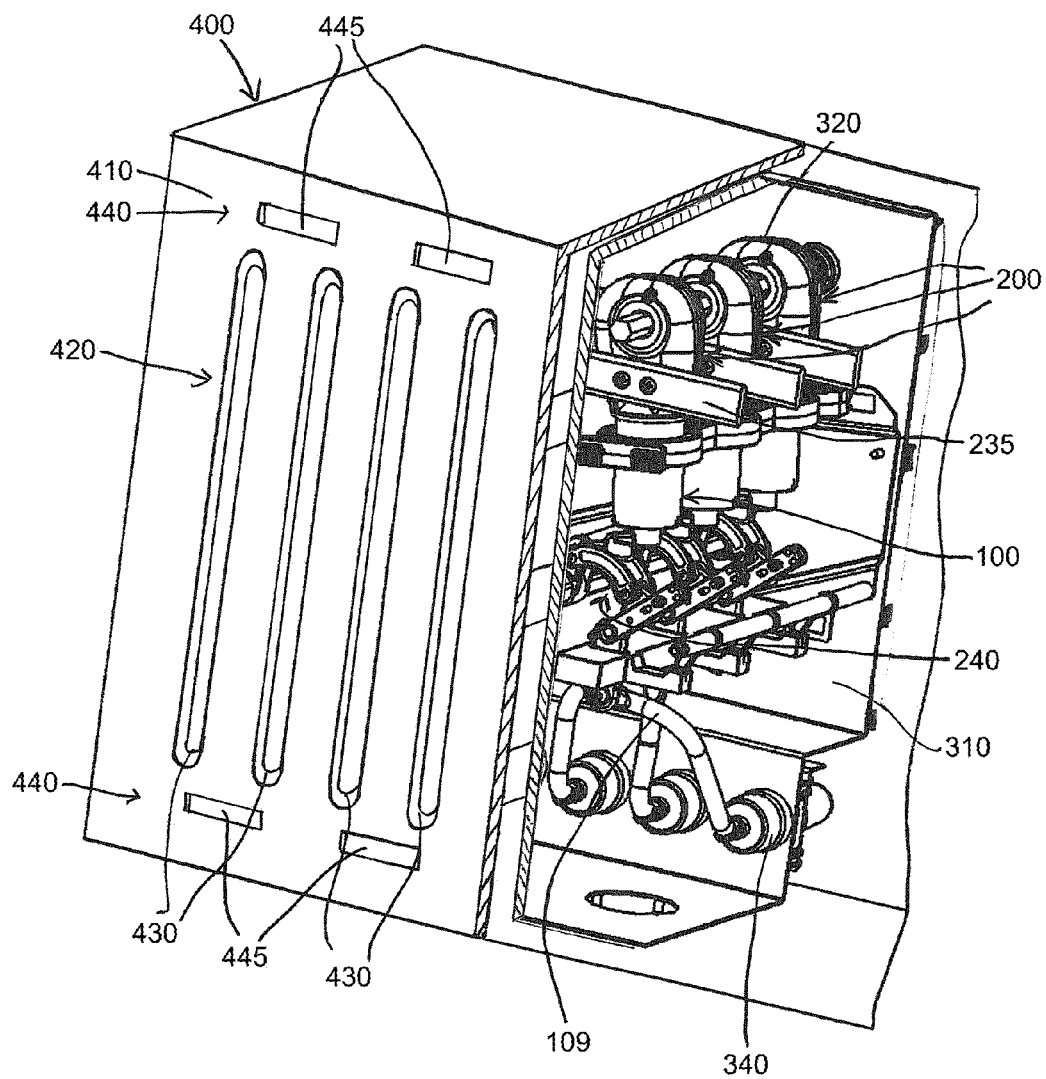
FIG. 10 shows schematically a switchgear comprising a cabinet in accordance with the present invention.

In FIG. 10 is shown a switchgear 300 comprising a cabinet 400 according to the present invention. In the illustrated example the switchgear corresponds to the switchgear of FIG. 9 but also other types of switchgear are of course feasible for this application and to be used in combination with the illustrated cabinet. The cabinet 400 is a cabinet in which the switchgear encapsulation 310 is placed on the site of the medium/high voltage distribution installation. The cabinet comprises walls of which at least one wall 410 has at least one wall part 420 designed with an increased heat radiation area for increased heat radiation to the surroundings, in order to promote cooling. This increased heat radiation area is at least partly in contact with at least a part of the encapsulation. In the illustrated embodiment the heat radiation area comprises corrugations 430. These corrugations can have any number of different forms, and also other forms are possible such as ridges, grooves, bumps etc. in any type of geometrical configuration. Further, the cabinet comprises two wall parts 440 having ventilation openings 445 in the wall. These ventilation openings may be arranged such that a free heat convection path is provided inside the cabinet, between the openings. The ventilation openings may then be arranged with at least one opening 445 at a lower end of the wall 410 and at least one opening 445 at an upper end of the wall. These openings 445 may for example be arranged in the vicinity of where the corrugations 430 terminate, as in the illustrated embodiment. Naturally, any wall of the cabinet may be provided with an increased heat radiation area and/or ventilation openings.

The invention shall not be considered limited to the illustrated embodiments, but can be modified and altered in many ways, as realised by a person skilled in the art, without departing from the scope defined in the appended claims.

The invention claimed is:

1. A switch assembly comprising a vacuum switch mounted to an at least partly electrically conductive housing, and comprising vacuum bottle holder for holding a vacuum bottle of the vacuum switch, which vacuum bottle holder is connected to the housing, characterised in that the housing comprises at least one gas entry opening at a lower end of the housing and at least one gas exit opening at an upper end of the housing, and that a first free heat convection path is provided inside the housing between the at least one gas entry opening and the at least one gas exit opening, in order to provide cooling, and in that the vacuum bottle holder comprises an upper end connected to the housing, a holder wall surrounding the vacuum bottle and a lower end, that the vacuum bottle holder further comprises at least one gas entry opening at the lower end thereof and at least one gas exit opening at the upper end thereof, and that a free space is provided between the vacuum bottle and the holder wall of the vacuum bottle holder such that a second free heat convection path is provided from the at least one gas entry opening of the vacuum bottle holder to the at least one gas exit opening of the vacuum bottle holder, via said free space, in order to provide cooling.

2. The switch assembly according to claim 1, characterized in that the housing is made of a material having a high thermal conductivity, the housing is made of an aluminium alloy.

3. The switch assembly according to claim 2, characterised in that the lower end comprises an end plate, and that the at least one gas entry opening of the vacuum bottle holder is located in the end plate.

4. The switch assembly according to claim 2, characterised in that the lower end of the housing is open towards the free space between the vacuum bottle and the vacuum bottle holder, whereby said at least one gas entry opening of the housing is formed, that the upper end of the vacuum bottle holder that is connected to the housing is open towards an interior of the housing whereby said at least one gas exit opening of the vacuum bottle holder is formed, that said gas exit opening of the vacuum bottle holder communicates with said gas entry opening of the housing, whereby said first and second free heat convection paths is a continuous path formed from the at least one gas entry opening of the vacuum bottle holder to the at least one gas exit opening of the housing via said free space and the housing.

5. The switch assembly according to claim 1, characterised in that the lower end of the housing has a side wall part in which said at least one gas entry opening of the housing is located, whereby said first free heat convection path is formed inside the housing extending from the at least one gas entry opening in the side wall part to the at least one gas exit opening in the upper end wall part of the housing.

6. The switch assembly according to claim 3, characterised in that the at least one gas exit opening of the vacuum bottle holder is located in the wall of the vacuum bottle holder, in the vicinity of the upper end of the vacuum bottle holder, whereby said second free heat convection path is formed in the vacuum bottle holder extending from the at least one gas entry opening in the end plate to the at least one gas exit opening in said wall, via said free space between the vacuum bottle and the vacuum bottle holder.

7. The switch assembly according to claim 1, characterised in that the housing has a housing wall with an interior surface and that at least a part of said interior surface has a rough surface structure providing an increased heat radiation area.

8. A switching device for electric power distribution, comprising
a switch assembly according to claim 1, in which the at least partially electrically conductive housing is connected to a first electric conductor,
a switch connector for connecting the vacuum switch to a second electric conductor,
wherein a current path is provided between the first electric conductor and the second electric conductor, via the switch connector and the switch assembly.

9. An electric power distribution switchgear, comprising a sealed encapsulation inside which is located at least one three-phase module comprising a switching device as defined in claim 8 for each one of said three phases.

10. The electric power distribution switchgear according to claim 9, wherein the sealed encapsulation is located inside a cabinet, and said cabinet comprises at least one wall having at least one wall part comprising an increased heat radiation area for increased heat radiation to the surroundings, which increased heat radiation area is at least partly in contact with at least a part of the encapsulation, in order to promote cooling.

11. The electric power distribution switchgear according to claim 10, wherein the at least one wall part comprising an increased heat radiation area comprises corrugations.

12. The electric power distribution switchgear according to claim 10, wherein said cabinet comprises at least one wall having at least one wall part comprising ventilation openings in the wall.

13. The electric power distribution switchgear according to claim 9, wherein the sealed encapsulation is filled with a gas that has a GWP of less than 150.

14. The electric power distribution switchgear according to claim 13, wherein the sealed encapsulation is filled with a gas that is dry air, or a gas that comprises air mixed with another gas.

15. A method for cooling a switch assembly comprising a vacuum switch mounted to an at least partly electrically conductive housing, and comprising a vacuum bottle holder for holding a vacuum bottle of the vacuum switch, which vacuum bottle holder is connected to the housing, characterised by
providing a free heat convection path through the housing between at least one gas entry opening at a lower end of the housing and at least one gas exit opening at an upper end the housing and
providing a free heat convection path in a free space provided between the vacuum bottle holder and the vacuum bottle.

* * * * *